(12) United States Patent
Erlmann et al.

(10) Patent No.: US 8,675,595 B2
(45) Date of Patent: Mar. 18, 2014

(54) METHOD FOR OPERATING A COMMUNICATION SYSTEM, COORDINATION NODE IN A COMMUNICATION SYSTEM AND COMMUNICATION SYSTEM

(75) Inventors: Markus Erlmann, Nürnberg (DE); Jens Grebner, Nürnberg (DE)

(73) Assignee: Siemens AG, Munich (DE)

( * ) Notice: Subject to any disclaimer, the term of this patent is extended or adjusted under 35 U.S.C. 154(b) by 713 days.

(21) Appl. No.: 12/664,789

(22) PCT Filed: Jun. 15, 2007

(86) PCT No.: PCT/EP2007/005438
§ 371 (c)(1),
(2), (4) Date: Dec. 15, 2009

(87) PCT Pub. No.: WO2008/151654
PCT Pub. Date: Dec. 18, 2008

(65) Prior Publication Data
US 2010/0177748 A1    Jul. 15, 2010

(51) Int. Cl.
*H04W 72/00* (2009.01)
*H04W 74/04* (2009.01)
(52) U.S. Cl.
USPC ............................ 370/330; 370/336; 370/345

(58) Field of Classification Search
None
See application file for complete search history.

(56) References Cited

U.S. PATENT DOCUMENTS

| | | | |
|---|---|---|---|
| 7,826,475 B2* | 11/2010 | Lee et al. ...................... | 370/445 |
| 2003/0137993 A1* | 7/2003 | Odman ......................... | 370/468 |
| 2007/0147332 A1* | 6/2007 | Lappetelainen et al. ....... | 370/346 |
| 2009/0067389 A1* | 3/2009 | Lee et al. ...................... | 370/336 |

FOREIGN PATENT DOCUMENTS

| | | |
|---|---|---|
| EP | 1 770 923 | 4/2007 |
| WO | WO 2006/049415 | 5/2006 |
| WO | WO 2007/021269 | 2/2007 |

* cited by examiner

*Primary Examiner* — Robert Scheibel
(74) *Attorney, Agent, or Firm* — Cozen O'Connor

(57) ABSTRACT

A coordination node in a communication system, a communication system and methods for operating the communication system which allows data transmission with a guaranteed latency even when there are a relatively large number of network nodes, wherein a plurality of network nodes in the communication system are combined to form a group. The network nodes in the group are allocated a respective common address, and at least one guaranteed timeslot within a transmission frame is made available to the network nodes in the group solely for use for the data transmission by assigning it to the common address.

20 Claims, 2 Drawing Sheets

METHOD FOR OPERATING A COMMUNICATION SYSTEM, COORDINATION NODE IN A COMMUNICATION SYSTEM AND COMMUNICATION SYSTEM

CROSS-REFERENCE TO RELATED APPLICATIONS

This is a U.S. national stage of International Application No. PCT/EP2007/005438, filed on 15 Jun. 2007. The contents of that application are expressly incorporated herein by reference.

BACKGROUND OF THE INVENTION

A method for operating a communications system is disclosed, for example, in the specification of the IEEE 802.15.4 standard "IEEE standard for information technology, telecommunications and information exchange between systems, local and metropolitan area networks, specific requirements, Part 15.4: Wireless Medium Access Control (MAC) and Physical Layer (PHY) Specifications for Low-rate Wireless Personal Area Networks (LR-WPANs), IEEE Computer Society, Oct. 1, 2003". According to this standard, a communications system in the form of a so-called "Wireless Personal Area Network (WPAN)" is used for transmitting data over comparatively short distances. In this case, an appropriate communications system can consist of a plurality of network nodes which can be arranged, for example, in a star formation around a coordination node in the form of a so-called "PAN coordinator". The network nodes in the communications system can each be assigned an address in the form of a so-called short address for communicating within the communications system by the coordination node. Here, the network nodes are also designated as devices in accordance with the standard.

Particularly in the field of automation technology, there is a requirement for process values of sensors and actuators to be exchanged predictably, reliably and with a guaranteed latency. The known method also provides the option of using a transmission frame in the form of a so-called superframe for transmitting data. In addition to time slots, which can be accessed concurrently by all network nodes in the communications system, this also makes so-called "guaranteed time slots" (GTS) available. Appropriate guaranteed time slots are characterized in that, within the transmission frame, they are each made exclusively available to one of the network nodes in the communications system for sole, i.e. competition-free, use for transmitting data. With conventional methods, this occurs such that the coordination node in the form of the "coordinator" assigns one or more of the appropriate guaranteed time slots to the respective network node based on its address, i.e. based on its short address, for example. The consequence of this is that only the network node identified by the respective address may use this guaranteed time slot for transmitting data within the transmission frame. This ensures that the respective network node is able to transmit data within a guaranteed latency to the coordination node, i.e. maintained under all circumstances.

SUMMARY OF THE INVENTION

However, one problem with the conventional methods is that, according to the IEEE 802.15.4 standard, a maximum of 7 appropriate guaranteed time slots can be assigned to network nodes or subscribers in the communications system, so that a maximum of 7 network nodes in the communications system are able to communicate based on appropriate guaranteed time slots. Consequently, either the number of network nodes in the communications system is restricted by the maximum number of guaranteed time slots, or some of the network nodes cannot be provided with a guaranteed time slot, i.e. data transmission in a specified time period, i.e. within a specified latency, is not guaranteed for the network nodes concerned. The consequence of this is that ultimately appropriate communications systems, for example, in accordance with the IEEE 802.15.4 standard, have up to now not become established or have only become established to a small extent in areas in which deterministic communication, i.e. communication with a predictable behavior and which is therefore reliable and has guaranteed latency, is required.

It is therefore an object of the present invention to provide a particularly effective and efficient method for operating a communications system which also enables data to be transmitted with a guaranteed latency for a larger number of network nodes.

This and other objects and advantages are achieved by a method for operating a communications system in which a plurality of network nodes in the communications system are combined to form a group, the network nodes in the group are each allocated a common address, and at least one guaranteed time slot within a transmission frame is made available to the network nodes in the group for sole use for transmitting data by assigning it to the common address.

The method according to the invention advantageously enables a plurality of network nodes to use a single guaranteed time slot within a transmission frame for transmitting data. A plurality of the network nodes are combined to form a group for this purpose. This can be achieved, for example, by storing an appropriate data table in a memory device of the communications system. In the next method step, the network nodes in the group are assigned a common address based on their group association. Consequently, one and the same address is used by all network nodes in the group. This enables the at least one guaranteed time slot to be made available to the network nodes in the group for transmitting data by assigning it to this common address. By this means, the at least one guaranteed time slot which is assigned to the common address can be used successively, i.e. in different transmission frames, by different network nodes in the group for transmitting data. Advantageously, it is not necessary to modify the network nodes used, for example, by appropriately configuring or by changing the firmware of the network nodes. This enables the method according to the invention to be introduced with relatively little effort.

It should be noted that, within the scope of the disclosed method of the invention, the network nodes of the communications system can also be combined to form a plurality of different groups, each network node preferably being assigned to a single group in.

Preferably, the method in accordance with the invention is implemented such that such network nodes, in which the at least one guaranteed time slot assigned to the common address is prevented from being used simultaneously, are combined to form a group. This is advantageous, as this prevents "collisions" resulting from a plurality of network nodes in the group trying to access the time slot assigned to the common address at the same time. Appropriate network nodes assigned to a group can, for example, be such with which, because of their function, it is ensured that only one of these network nodes has data to transmit by means of the guaranteed time slot at any time, i.e. in any transmission frame. Appropriate network nodes can be, for example, those that are used to switch off or switch on a motor for instance, only one of the two functions being possible depending on the current state of the motor. In addition, the network nodes in the group can be arranged spatially separately such that because of the progression of a monitored process the need for the network nodes in the group to transmit data simultaneously using the at least one guaranteed time slot is avoided. The network nodes in the group can therefore be sensors mounted along a route, for example, which monitor the travel of a commodity or a vehicle for example. As long as only one appropriate commodity or one appropriate vehicle is allowed on the route at any time, then it can be ruled out with certainty that a plurality of the network nodes of the communications system in the form of the sensors want to simultaneously report a passing of the object concerned by transmitting the appropriate data, for example to a central control unit.

In a further particularly preferred embodiment, the method in accordance with the invention is implemented such that the network nodes are combined to form the group based on an extended address which in each case unambiguously identifies the network nodes. As a result, the network nodes can advantageously be combined to form the group using an extended address which is generally already defined for network nodes of a communications system and which unambiguously identifies the network nodes concerned. In addition, the extended addresses of the network nodes in the group can advantageously be used to provide a dedicated means of addressing one of the network nodes.

Preferably, the method in accordance with the disclosed embodiments can also be implemented such that the common address is assigned to each individual network nodes in the group when they log on to the communications system. This is advantageous, as network nodes usually have to log on in communications systems. As part of the communication which transpires in this regard, it is possible to assign the common address to the respective network node in the group in a manner which is both simple and avoids unnecessary signaling effort.

Advantageously, the method in accordance with the contemplated embodiments can also be implemented such that the at least one guaranteed time slot is assigned to the common address in response to an appropriate request from one of the network nodes in the group. Consequently, as soon as one of the network nodes in the group requests a guaranteed time slot, this guaranteed time slot is assigned to the common address. As a result, all network nodes in the group can now communicate, i.e. transmit data, in the respective guaranteed time slot. Because the at least one guaranteed time slot is only assigned to the common address in response to an appropriate request from one of the network nodes in the group, this advantageously avoids an unnecessary static reservation of time slots by network nodes or groups of network nodes.

In a further preferred embodiment, the assignment of the common address and the assignment of the at least one guaranteed time slot to the network nodes in the group is performed by a coordination node in the communications system. This offers the advantage that a single central node in the communications system in the form of the coordination node can undertake the assignment of the common address, as well as the assignment of the at least one guaranteed time slot to the network nodes in the group. Preferably, combining the plurality of network nodes to form the group is also performed by the coordination node. For this purpose, the coordination node can store and manage information relating to the existing groups, for example, in a memory device connected to the coordination node. The coordination node is preferably connected to the network nodes in the communications system in a star arrangement, i.e., in this case communication between the network nodes and the coordination node takes place directly in each case, i.e. without interposing further network nodes.

As a general principle, the method in accordance with the disclosed embodiments can be used in any type of communications system. This also particularly includes wired communications systems. In an especially preferred embodiment however, a wireless communications system is used as the communications system. This is advantageous because an appropriate wireless connection between the network nodes in the communications system is an advantage in many cases. This particularly saves the costs and effort for appropriate wiring or cabling. In addition, the transmission resources in wireless communications systems are usually comparatively restricted and therefore also valuable, so that particularly in such communications systems there is a requirement to use the existing transmission resources as efficiently as possible and at the same time facilitate reliable and deterministic communication.

In general, the wireless communications system can be a communications system in accordance with any communications standard. In a further particularly preferred embodiment of the method in accordance with the disclosed embodiments, however, a wireless communications system according to the IEEE 802.15.4 standard is used. This means particularly that devices as defined by the IEEE 802.15.4 standard are used as network nodes. The use of a communications system according to the IEEE 802.15.4 standard is advantageous, because this communications standard has been especially specified against the background of minimizing the power consumption of the network nodes in the communications system by dispensing with unnecessary complexity and limiting the system to a comparatively low data rate. As a result, battery lives in the order of magnitude of months or years are achieved even for battery-operated network nodes. In addition, the IEEE 802.15.4 standard already provides support for guaranteed time slots which can be assigned to the network nodes or network subscribers. Because of these characteristics, a wireless communications system operating in accordance with the IEEE 802.15.4 standard is particularly suitable for a wireless connection of communication nodes and for use in conjunction with the disclosed embodiments of method of the invention.

As a general principle, the communications system can be a communications system which is used in any field, for any function and for any application. In a particularly preferred embodiment, however, an automation technology communications system with network nodes in the form of sensors and/or actuators is used. This is advantageous, because there is a high demand for wireless communication between the different components in the field of automation technology. The transmitted data is frequently used for a time-critical control system or has to be further processed directly without a time delay for other reasons. As a result, there is also a requirement, particularly in the field of automation technology, to use communications systems which have a predictable, i.e., defined and reproducible, behavior and with which data can be exchanged with a guaranteed delay, i.e., latency.

In a further preferred embodiment, in order to change one of the network nodes in the group for another network node, the network node in the group to be changed is replaced by the other network node, the common address of the group is assigned to the other network node, and the network node to be changed is removed from the communications system. The present contemplated embodiment makes it advantageously possible to easily change a network node in the form of an assembly, for example.

In a further preferred embodiment, the network nodes in the communications system each transmit status information at specified time intervals via a time slot of the transmission frame which is generally available for transmitting data. If status information is to be transmitted by the network nodes in the communications system at specified time intervals, for example, to a central control unit, then to avoid simultaneous access to the guaranteed time slot by a plurality of network nodes in the group, advantageously this is also performed for the network nodes in the group using a time slot of the transmission frame which is generally available for transmitting data. Appropriate generally available time slots are available, for example, in the IEEE 802.15.4 standard within the so-called "Contention Access Period". By regularly transmitting appropriate status information, which is also referred to as heartbeat, the receiver is advantageously informed of the functional capability of the network node concerned.

The invention also relates to a coordination node in a communications system. With regard to the coordination node in the communications system, it is also an object of the invention to specify a coordination node which supports a particularly effective and efficient method for operating the communications system, and which also enables data to be transmitted with a guaranteed latency for a larger number of network nodes.

In accordance with the invention, this object is achieved by a coordination node in a communications system having memory means for storing an assignment of a plurality of network nodes in the communications system to a group, and processing means for assigning a common address to the network nodes in the group and for providing at least one guaranteed time slot within a transmission frame to transmit data for the network nodes in the group by assigning the at least one guaranteed time slot to the common address of the network nodes in the group.

The coordination node in accordance with the invention advantageously allows an assignment of a plurality of network nodes in the communications system to a group to be stored in memory means. The processing means of the coordination node are configured to assign a common address to the network nodes in the group and to provide at least one guaranteed time slot within a transmission frame for transmitting data for the network nodes in the group by assigning the at least one guaranteed time slot to the common address of the network nodes in the group. As a result, the coordination node advantageously enables the plurality of network nodes in the group to each use the same guaranteed time slot for transmitting data. This has the basic advantage that the number of network nodes in the communications system which can communicate, for example, with the coordination node using a guaranteed time slot, is not restricted by the number of guaranteed time slots which are available in the transmission frame.

In a particularly preferred embodiment of the coordination node, the processing means for assigning the common address to the network nodes in the group are configured based on an extended address which unambiguously identifies each of the network nodes. This is advantageous, because network nodes in the communications system are usually already identified by means of appropriate extended addresses. These can therefore be used to assign the network nodes to the group in the memory means of the coordination node.

In a particularly preferred embodiment, the coordination node is formed such that the processing means are configured to assign the common address to the network nodes in the group whenever the network nodes log on to the communications system. This advantageously enables the common address to be assigned particularly easily and efficiently to the network nodes in the group.

Preferably, the coordination node is formed such that the processing means are configured to assign the at least one guaranteed time slot to the common address in response to an appropriate request from one of the network nodes in the group. As a result, a guaranteed time slot is advantageously only made available to the network nodes in the group when at least one of the network nodes in the group has actually reported a requirement for an appropriate guaranteed time slot. Moreover, this advantageously prevents a group of network nodes occupying guaranteed time slots unnecessarily.

The coordination node can be a node in any communications system, for example, a wired communications system. In a particularly preferred embodiment, however, the coordination node has a wireless interface for use in a wireless communications system. As a result, the coordination node can also be advantageously used in those applications where wired communications systems cannot generally be used or have corresponding disadvantages because of the necessary wiring.

In a further particularly preferred embodiment, the wireless interface is configured in accordance with the IEEE 802.15.4 standard. This standard is a particularly easy, reliable and robust standard which can advantageously be used in particular for communications systems with a comparatively small number of network nodes and a comparatively small spatial distribution. For this reason, the IEEE 802.15.4 standard is currently becoming increasingly established in different technical fields.

The invention also relates to a communications system with a plurality of network nodes. With regard to the communications system, it is another object of the invention to provide a communications system which supports a particularly effective and efficient method for operating the communications system, which also enables data to be transmitted with a guaranteed latency for a larger number of network nodes.

In accordance with the invention, this object is achieved by a communications system having a plurality of network nodes which include a coordination node in accordance with the invention or a coordination node according to one of the previously described preferred embodiments of the coordination node in accordance with the invention.

Regarding the advantages of the communications system in accordance with other objectives of the invention, reference is made to the corresponding embodiments in conjunction with the coordination node according to the invention and its preferred developments.

BRIEF DESCRIPTION OF THE DRAWINGS

The invention is described in more detail below with reference to an exemplary embodiment, in which.

DETAILED DESCRIPTION OF THE PREFERRED EMBODIMENTS

Figure 1:
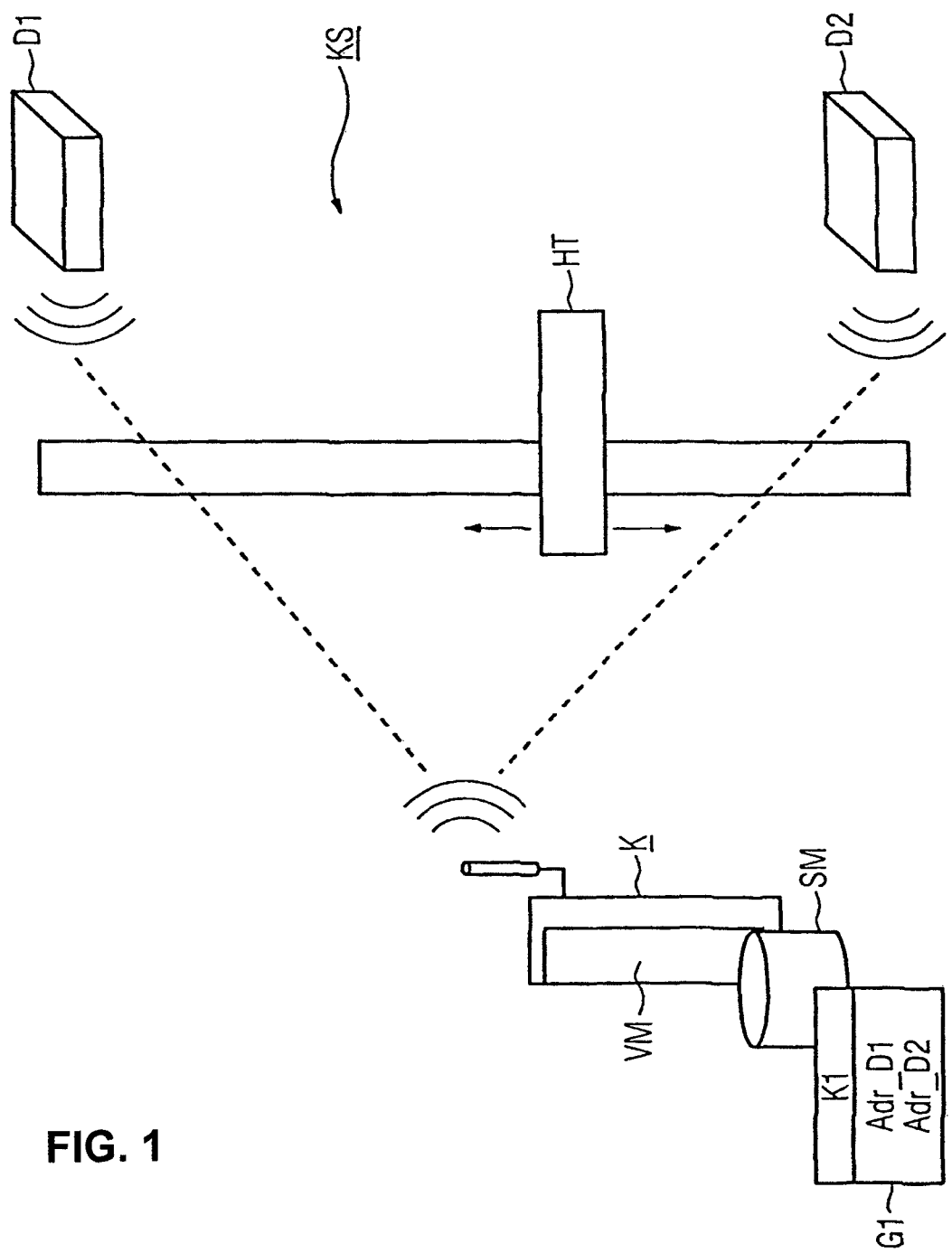
FIG. 1 shows an exemplary embodiment of the communications system according to the invention with an exemplary embodiment of the coordination node according to the invention in a schematic diagram in order to explain an exemplary embodiment of the method according to the invention.

FIG. 1 shows a communications system KS which consists of a coordination node K and two network nodes D1, D2.

Here it is assumed that the network nodes D1, D2 are limit switches or end position switches of a lift table HT. Furthermore, it is assumed that the IEEE 802.15.4 standard is used within the communications system KS for communicating between the network nodes D1, D2 and the coordination node K, which could for instance be a central control unit. When the top or bottom end position switch comprising network nodes D1 and D2 respectively is reached by the lift table HT, in order to be able to transmit the occurrence of this event directly to the coordination node K, it must be ensured that this information or the appropriate data is transmitted deterministically, i.e. reliably and predictably, and with a guaranteed latency of less than 15 ms, for example. A corresponding transmission of data is also required with many other technical solutions, particularly in the field of automation technology. For this reason, it is a common requirement in process control systems to be able to exchange process values from sensors and actuators reliably and quickly. For this purpose, the IEEE 802.15.4 standard advantageously provides support for guaranteed time slots within a transmission frame which can be assigned to the network subscribers, i.e., the network nodes D1, D2, ensuring cyclic transmission of data with a guaranteed latency that is essentially determined by the temporal length of a transmission frame.

However, at the most, 7 such guaranteed time slots are provided in the appropriate standard so that a maximum of 7 network nodes can communicate with the coordination node K based on the guaranteed time slots. Conventional systems are frequently more complex than the exemplary embodiment shown in FIG. 1. Therefore in many cases, more than 7 network nodes are present in a corresponding communications system. Here, the problem arises in that not all network nodes in such a communications system can be provided with an appropriate guaranteed time slot for transmitting data.

Within the framework of the described exemplary embodiments of the invention, this problem is solved by assigning the two network nodes D1, D2 to a group G1 in memory means SM of the coordination node K. This is achieved by storing extended addresses Adr_D1, Adr_D2, which are also described within the framework of the IEEE 802.15.4 standard as static or extended addresses, which unambiguously identify the network nodes D1, D2 respectively of group G1 in a table in the memory means SM. Furthermore, a common address K1, in the form of a short address, for example, which is applicable to all network nodes D1, D2 in the group, is also stored in the corresponding database table of group G1. If the two network nodes D1, D2 now log on to the coordination node K of the communications system KS in any time sequence, then the coordination node K of the communications system KS assigns the same common address K1 to both network nodes D1, D2, which in the exemplary embodiment described should be a dynamic short address. The coordination node K includes processing means VM for assigning the common address K1 to the network nodes D1, D2 of group G1.

It should be noted that, as a basic principle, more than two network nodes can of course also be combined to form one group. In addition, it is also possible to combine the existing network nodes within a communications system to form a plurality of different groups.

If one of the two network nodes D1, D2 now requests a guaranteed time slot from the coordination node K for sole use for transmitting data, then this guaranteed time slot is made available for transmitting data by assigning the network nodes D1, D2 of group G1 to the common address K1. Consequently, the guaranteed time slot cannot be used by other network nodes of the communications system KS, which are not shown in the figure for reasons of clarity. The provision of at least one guaranteed time slot within the transmission frame for transmitting data for the network nodes D1, D2 in group G1 by assigning the at least one guaranteed time slot to the common address K1 of network nodes D1, D2 in group G1 is likewise performed by the processing means VM of the coordination node K.

Advantageously, only such network nodes D1, D2 or devices are combined in the group G1 for which the guaranteed time slot of the transmission frame assigned to them is prevented from being used simultaneously. This avoids a corresponding collision when the guaranteed time slot is used within the same transmission frame. This can be ensured, for example, by appropriate spatial or functional separation of the network nodes D1, D2. In the exemplary embodiment shown in FIG. 1, it can therefore clearly be seen that with certainty only the network node D1 or the network node D2 will report that the top or bottom end position respectively of the lift table HT has been reached, and will use the guaranteed time slot for this purpose. As a result, the guaranteed time slot is prevented from being used simultaneously by the network nodes D1, D2.

If, by way of example, the network node D1 is to be replaced by another network node as part of a module exchange, for example, then this can advantageously be performed in a manner such that the network node D1 is first removed from the communications system KS. Thereupon, the entry for the extended address Adr_D1 of network node D1 within the table for group G1 in the memory means SM of the coordination node K is replaced by the extended address of the other network node. The other network node can now log on to the communications system KS or to the coordination node K of the communications system KS, and as a result of the entry in the table of group G1 is automatically assigned the common address K1, which was previously also assigned to network node D1. As a consequence, the other network node now shares the use of the appropriate guaranteed time slot with network node D2.

If a regular transmission of status information should be required from the network nodes D1, D2 to the coordination node K, then this can preferably occur by the appropriate data being transmitted, for example, in the form of a so-called heartbeat, from the appropriate network node D1, D2 in each case via a time slot of the transmission frame which is generally available for transmitting data. This means that the guaranteed time slot assigned to group G1 is specifically not used for providing appropriate status information. This prevents the network nodes D1, D2 from trying to use the guaranteed time slot simultaneously, i.e., in the same transmission frame, for transmitting appropriate status information. Appropriate status information can usually be provided at significantly greater time intervals and a considerably greater latency can be tolerated than for time-critical data transmissions. Consequently, a guaranteed cycle time is unnecessary in this case so that it is not necessary to use the guaranteed time slot.

Advantageously, no project engineering effort is generally required within the scope of the contemplated embodiments of the method of the invention for the network nodes D1, D2 of the communications system KS. In particular, in comparison with known methods, it is not necessary to change the firmware on the network nodes D1, D2 so that common standard network nodes can be used. In addition, the grouping of network nodes D1, D2 is advantageously performed exclusively on the coordination node K, for which only software changes are required to implement the method in accordance with the disclosed embodiments. Furthermore, it is not usually necessary to change the protocol used, i.e., the IEEE 802.15.4 protocol in the exemplary embodiment shown in FIG. 1.

If the coordination node K wants to address one of the nodes D1, D2 in a dedicated manner, then it is still possible to do so by using the respective extended address Adr_D1, Adr_D2 regardless of the association of the network node D1, D2 with the group G1.

Compared with known methods, the number of network nodes D1, D2 which are able to use a guaranteed time slot is increased many times by the disclosed embodiments of the method in accordance with the invention. Here, the number of network nodes D1, D2 which can be combined to form a group G1 is basically unrestricted. However, the number network nodes D1, D2 is dependent on the respective application-specific circumstances. At the same time, the latency which can be achieved within the communications system KS is advantageously unchanged so that the quality of the data transmission is not degraded. Which of the network nodes D1, D2 has transmitted the respective data in each case can still be determined by a device, for example, in the form of the coordination node K, which receives data from one of the network nodes D1, D2 using the guaranteed time slot, either based on the received data itself or from the respective association.

Figure 2:
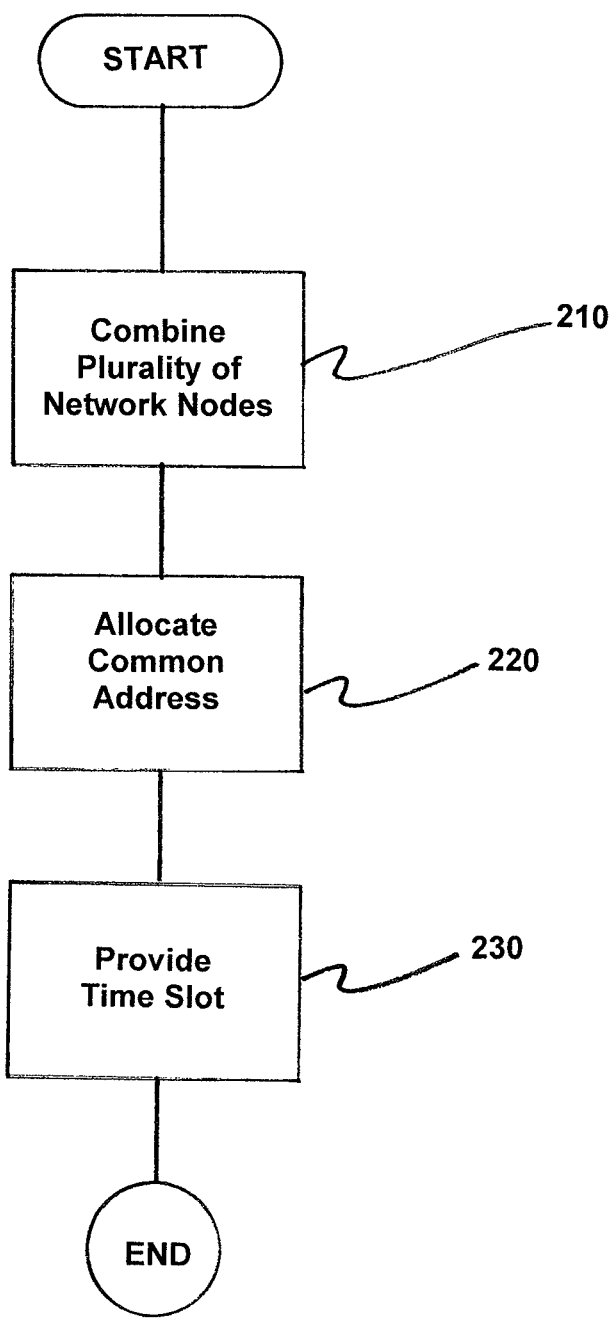
FIG. 2 is a flow chart of the method in accordance with the invention.

FIG. 2 is a flow chart illustrating the method in accordance with an exemplary embodiment of the invention. Initially, a plurality of network nodes (D1, D2) in the communications system (KS) are combined to form a group (G1), as indicated in step 210. Next, the network nodes (D1, D2) in the group (G1) are each allocated a common address (K1), as indicated in step 220. At least one guaranteed time slot within a transmission frame is made available to the network nodes (D1, D2) in the group (G1) for sole use for transmitting data by assigning it to the common address (K1), as indicated in step 230.

Thus, while there have shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. Moreover, it should be recognized that structures shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for operating a communications system, comprising the steps of:
combining a plurality of network nodes in the communications system to form a group, each of said plural network nodes comprising a sensor mounted along a route;
allocating a common address to each of said plural network nodes in the group; and
providing at least one guaranteed time slot within a transmission frame for transmitting data assigned to the allocated common address;
wherein the at least one guaranteed time slot is available to each of said plural network nodes in the group; and
wherein only network nodes of the plurality of network nodes are combined in the group for which the at least one guaranteed time slot of the assigned transmission frame is prevented from being used simultaneously.

2. The method as claimed in claim 1, wherein the plural network nodes combined to form the group are prevented from simultaneously using the at least one guaranteed time slot assigned to the allocated common address.

3. The method as claimed in claim 1, wherein each of said plural network nodes combined to form the group are based on an extended address which unambiguously identifies each of said plural network nodes.

4. The method as claimed in claim 2, wherein each of said plural network nodes combined to form the group are based on an extended address which unambiguously identifies each of said plural network nodes.

5. The method as claimed in claim 1, wherein the common address is assigned to individual ones of the plural network nodes in the group when the individual ones of said plural network nodes log on to the communications system.

6. The method as claimed in claim 1, wherein the at least one guaranteed time slot is assigned to the common address in response to an appropriate request from one of said plural network nodes in the group.

7. The method as claimed in claim 1, wherein the assignment of the common address and the assignment of the at least one guaranteed time slot to each of said plural network nodes in the group is performed by a coordination node in the communications system.

8. The method as claimed in claim 1, wherein the communications system comprises a wireless communications system.

9. The method as claimed in claim 8, wherein the wireless communications system operates in accordance with the IEEE 802.15.4 standard.

10. The method as claimed in claim 1, wherein the communications system comprises an automation technology communications system including the plural network nodes, wherein each of the plural network nodes comprises at least one of a sensor and an actuator.

11. The method as claimed in one claim 1, wherein to change one of said plural network nodes in the group for another network node, the method further comprising the steps of:
replacing a network node in the group to be changed by another network node;
assigning the common address of the group to the other network node; and
removing the network node to be changed from the communications system.

12. The method as claimed in claim 1, wherein each of said plural network nodes in the communications system transmits status information at specified time intervals via a time slot of the transmission frame which is generally available for transmitting data.

13. A coordination node of a communications system, comprising:
memory means for storing an assignment of a plurality of network nodes in the communications system to a group, each of each of said plural network nodes comprising a sensor mounted along a route; and
processing means for assigning a common address to the network nodes in the group and for providing at least one guaranteed time slot within a transmission frame to transmit data for said plural network nodes in the group by assigning the at least one guaranteed time slot to a common address of said plural network nodes in the group;
wherein only network nodes of the plurality of network nodes are combined in the group for which the at least one guaranteed time slot of the assigned transmission frame is prevented from being used simultaneously.

14. The coordination node as claimed in claim 13, wherein the memory means for assigning each of said plural network nodes to the group are configured based on an extended address which unambiguously identifies each of said plural network nodes.

15. The coordination node as claimed in claim 13, wherein the processing means are configured to assign the common address to individual ones of said plural network nodes in the group whenever the individual ones of said plural network nodes log on to the communications system.

16. The coordination node as claimed in claim 14, wherein the processing means are configured to assign the common address to individual ones of said plural network nodes in the group whenever the individual ones of said plural network nodes log on to the communications system.

17. The coordination node as claimed in claim 13, wherein the processing means are configured to assign the at least one guaranteed time slot to the common address in response to an appropriate request from one of said plural network nodes in the group.

18. The coordination node as claimed in 13, further comprising a wireless interface for implementation in a wireless communications system.

19. The coordination node as claimed in claim 18, wherein the wireless interface is configured in accordance with the IEEE 802.15.4 standard.

20. A communications system, comprising:

a plurality of network nodes, each of said plural network nodes comprising a sensor mounted along a route; and a coordination node comprising:

memory means for storing an assignment of each of said plural network nodes in the communications system to a group; and processing means for assigning a common address to each of said plural network nodes in the group and for providing at least one guaranteed time slot within a transmission frame to transmit data for said plural network nodes in the group by assigning the at least one guaranteed time slot to a common address of said plural network nodes in the group;

wherein only network nodes of the plurality of network nodes are combined in the group for which the at least one guaranteed time slot of the assigned transmission frame is prevented from being used simultaneously.

* * * * *